United States Patent
Ogasawara et al.

(10) Patent No.: US 10,201,761 B2
(45) Date of Patent: *Feb. 12, 2019

(54) ATTACHMENT AND GAME SYSTEM

(71) Applicant: NINTENDO CO., LTD., Kyoto-shi, Kyoto (JP)

(72) Inventors: Yoshiyasu Ogasawara, Kyoto (JP); Yasuyuki Shimohata, Kyoto (JP); Naoki Hatta, Kyoto (JP); Takeshi Nishikawa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/656,191

(22) Filed: Jul. 21, 2017

(65) Prior Publication Data
US 2018/0043270 A1   Feb. 15, 2018

(30) Foreign Application Priority Data
Aug. 9, 2016  (JP) .................................. 2016-156344

(51) Int. Cl.
*A63F 13/98*       (2014.01)
*A63F 13/213*      (2014.01)
(Continued)

(52) U.S. Cl.
CPC ............ *A63F 13/98* (2014.09); *A63F 13/213* (2014.09); *A63F 13/22* (2014.09); *A63F 13/24* (2014.09);
(Continued)

(58) Field of Classification Search
CPC ...... A63F 13/213; A63F 13/24; A63F 13/245; A63F 13/90; A63F 13/98
See application file for complete search history.

(56) References Cited

U.S. PATENT DOCUMENTS

| | | |
|---|---|---|
| 8,482,540 B1 | 7/2013 | Reeves et al. |
| 9,996,107 B2 | 6/2018 | Inoue et al. |

(Continued)

FOREIGN PATENT DOCUMENTS

| | | |
|---|---|---|
| JP | 2010-017387 | 1/2010 |
| JP | 2010-17387  | 1/2010 |

OTHER PUBLICATIONS

Office Action dated Jul. 27, 2018 issued in U.S. Appl. No. 15/656,162 (6 pgs.).

(Continued)

*Primary Examiner* — Jay Trent Liddle
(74) *Attorney, Agent, or Firm* — Nixon & Vanderhye PC

(57) ABSTRACT

An attachment configured to be attached to a game controller with a camera is provided. The attachment includes a housing having a support portion which supports the game controller and an operation portion in the housing. The support portion supports the game controller such that a direction of shooting of the camera is oriented to the inside of the housing and supports the game controller such that a field of view of shooting with the camera includes a first region including a first indication in the housing as a subject and a second region including a second indication in the housing as a subject. The first indication is located such that a position thereof is maintained regardless of an operation onto the operation portion, and the second indication is located such that a position thereof is variable in accordance with an operation onto the operation portion.

21 Claims, 18 Drawing Sheets

(51) Int. Cl.
 A63F 13/22   (2014.01)
 A63F 13/24   (2014.01)
 A63F 13/211  (2014.01)
 A63F 13/327  (2014.01)
 A63F 13/70   (2014.01)

(52) U.S. Cl.
 CPC ........... *A63F 13/211* (2014.09); *A63F 13/327* (2014.09); *A63F 13/70* (2014.09)

(56) References Cited

U.S. PATENT DOCUMENTS

| | | |
|---|---|---|
| 2006/0256090 A1 | 11/2006 | Huppi |
| 2010/0007528 A1 | 1/2010 | Urata et al. |
| 2011/0090177 A1 | 4/2011 | Chuang |
| 2012/0287051 A1 | 11/2012 | Takabu |
| 2018/0028913 A1* | 2/2018 | Onozawa ................ A63F 13/40 |

OTHER PUBLICATIONS

European Search Report dated Jun. 22, 2016 issued in corresponding European Application No. 16152949.0 (8 pgs.).
Office Action dated Nov. 30, 2017 issued in U.S. Appl. No. 15/010,153 (14 pgs.).
U.S. Appl. No. 15/656,162, filed Jul. 21, 2017 (43 pgs.).

* cited by examiner

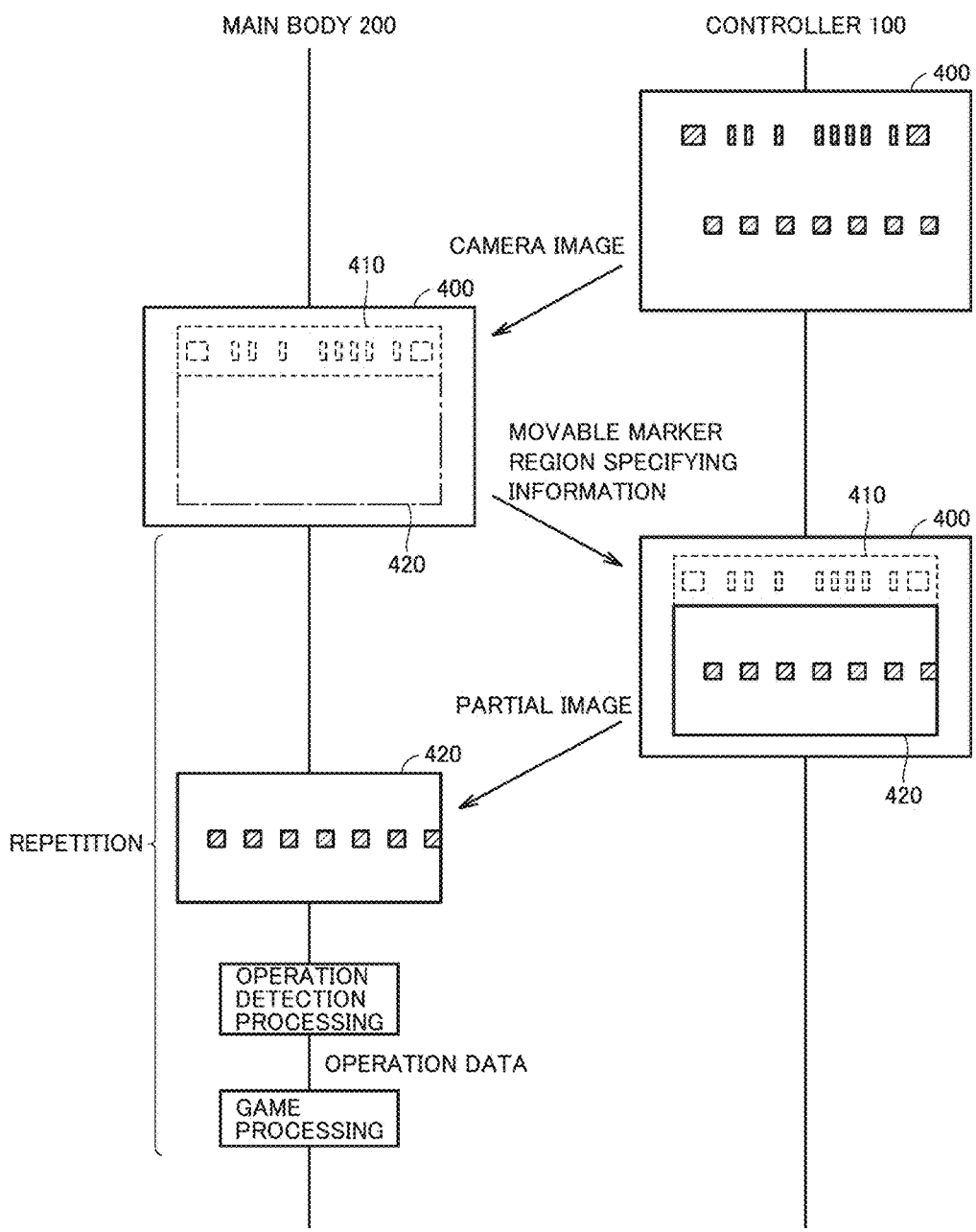

ATTACHMENT AND GAME SYSTEM

This nonprovisional application is based on Japanese Patent Application No. 2016-156344 filed with the Japan Patent Office on Aug. 9, 2016, the entire contents of which are hereby incorporated by reference.

FIELD

The present disclosure relates to an attachment and a game system including the attachment.

BACKGROUND AND SUMMARY

An accessory which adds functions to a portable device by being connected to the portable device has conventionally been available. For example, such a technique that another controller as an accessory is connected to a connector provided in a controller of a game device has been disclosed. According to this technique, further various game operations can be performed by using two controllers.

The accessory disclosed in the background art as described above requires circuitry for communicating with a portable device or circuitry for information processing for generating information to be transmitted to the portable device, and such a configuration is yet to be improved.

An exemplary embodiment provides an attachment which can implement various game operations by being used together with a game controller or the like while it maintains a simplified configuration and a game system including the attachment.

An exemplary embodiment provides an attachment configured to be attached to a game controller with a camera. The attachment includes a housing having a support portion which supports the game controller and an operation portion in the housing. The support portion supports the game controller such that a direction of shooting of the camera is oriented to the inside of the housing and supports the game controller such that a field of view of shooting with the camera includes a first region including a first indication in the housing as a subject and a second region including a second indication in the housing as a subject. The first indication is located such that a position thereof is maintained regardless of an operation onto the operation portion and the second indication is located such that a position thereof is variable in accordance with an operation onto the operation portion.

At least one of the first indication and the second indication may be made of a reflective material.

The first indication may contain information for detecting presence of the attachment.

The first indication may contain information for specifying a type of the attachment.

The first indication may contain information indicating a reference position for detecting variation in position by the operation onto the operation portion.

The first indication may be located on an outer peripheral side in the field of view of shooting with the camera, and the second indication may be located on an inner side relative to the first indication in the field of view of shooting with the camera.

The operation portion may include a button mechanism.
The operation portion may include a rotation mechanism.
The operation portion may include a slide mechanism.
The operation portion may include a biasing mechanism which resists against the operation onto the operation portion.

The camera may include an infrared camera.

At least one of the first indication and the second indication may be made of a material which absorbs infrared rays, and a pattern made of a material which does not absorb infrared rays may be further formed in a region other than a region where the first indication and the second indication are located.

The pattern made of the material which does not absorb the infrared rays may be located as being integrated with at least one of the first indication and the second indication.

The pattern made of the material which does not absorb the infrared rays may be located between a plurality of the first indications or between a plurality of the second indications, as being integrated with the plurality of the indications.

The game controller may further include a light source for emitting light to the subject, and the first indication may have a lower reflectance to light from the light source than the second indication.

The camera may have a light source for emitting light to the subject, and an inner surface of the housing may have an intermediate reflectance to light from the light source between a reflectance of the first indication to light from the light source and a reflectance of the second indication to light from the light source.

The first indication and the second indication may be located so as to be different in depth position in the direction of shooting with the camera.

A game system according to another embodiment includes a game controller with a camera, an attachment configured to be attached to the game controller, and a main body which processes operation data obtained by the game controller. The attachment includes a housing having a support portion which supports the game controller and an operation portion in the housing. The support portion supports the game controller such that a direction of shooting of the camera is oriented to the inside of the housing and supports the game controller such that a field of view of shooting with the camera includes a first region including a first indication in the housing as a subject and a second region including a second indication in the housing as a subject. The first indication is located such that a position thereof is maintained regardless of an operation onto the operation portion, and the second indication is located such that a position thereof is variable in accordance with an operation onto the operation portion. The game controller transmits image data obtained by shooting with the camera to the main body. The main body performs first processing based on an image of a portion corresponding to the first region included in the image data and performs second processing based on an image of a portion corresponding to the second region included in the image data and a result of the first processing.

The game controller may further extract a part of the entire image shot by the camera and generate the image data.

The main body may generate region specifying information which specifies the second region as the first processing and transmit the region specifying information to the game controller. The game controller may generate the image data corresponding to the second region based on the region specifying information and transmit the image data to the main body. The main body may perform the second processing based on the image data corresponding to the second region.

The main body may further extract a partial image necessary for processing in the first processing and the second processing from the image data received from the game controller.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 8 shows an exemplary illustrative non-limiting drawing illustrating overview of processing for generating operation data in the game system according to the present embodiment.

DETAILED DESCRIPTION OF NON-LIMITING EXAMPLE EMBODIMENTS

Figure 1:
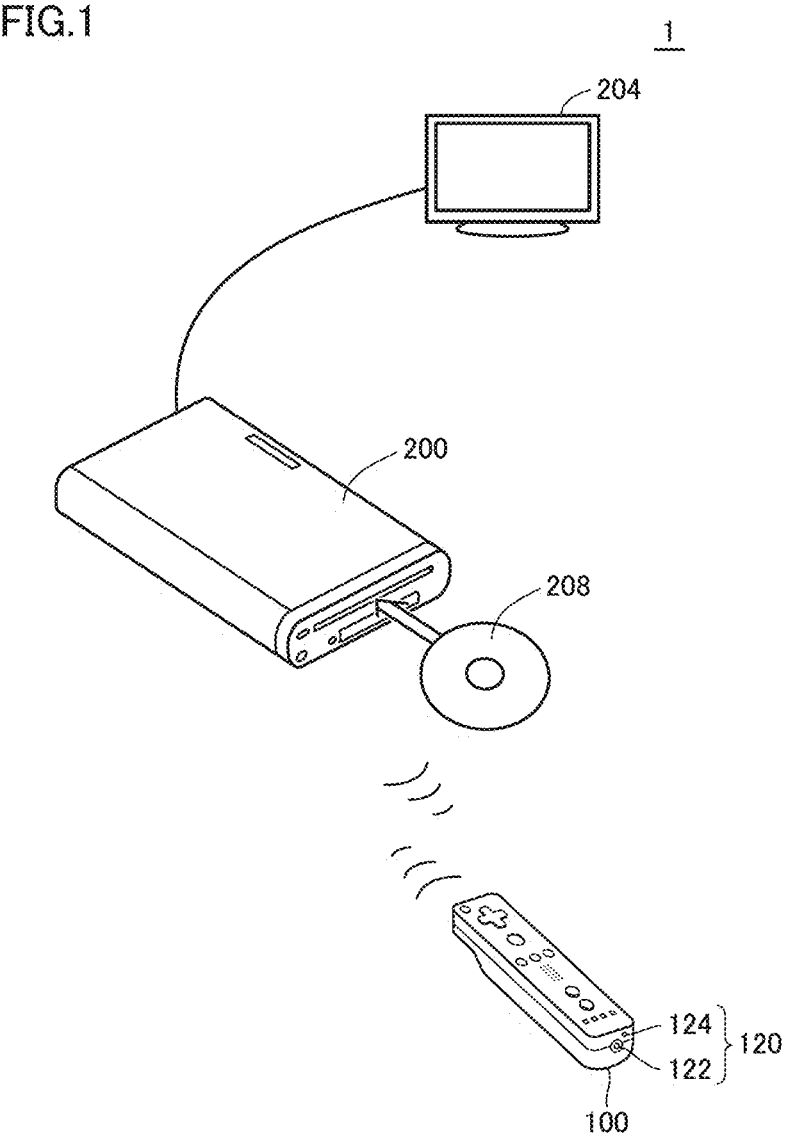
FIG. 1 shows an exemplary illustrative non-limiting drawing illustrating appearance of a game system according to the present embodiment.

The present embodiment will be described in detail with reference to the drawings. The same or corresponding elements in the drawings have the same reference characters allotted and description thereof will not be repeated.

<A. Configuration of Game System>

A configuration of a game system 1 according to the present embodiment will initially be described.

(a1: Overall Configuration of System)

One example of appearance of game system 1 according to the present embodiment will be described with reference to FIG. 1. Game system 1 includes one game controller 100 or a plurality of game controllers 100 (hereinafter also simply denoted as a "controller 100") and a main body 200 connected to one controller 100 or a plurality of controllers 100. A display 204 such as a television is connected to main body 200 and video images and/or voice and sound are output from display 204 in accordance with video signals and/or audio signals output from main body 200.

Though FIG. 1 shows a configuration example in which information is exchanged between controller 100 and main body 200 through radio communication, information may be exchanged with each other through wired communication.

Controller 100 constituting game system 1 according to the present embodiment has an image pick-up portion 120 at one end. An attachment as will be described later can be attached to image pick-up portion 120 of controller 100.

Though controller 100 which communicates with main body 200 as shown in FIG. 1 is described as a typical example of the game controller in the description below, limitation thereto is not intended and any device having a function corresponding to image pick-up portion 120 can be employed as the game controller. For example, a portable game device itself including a display and an operation portion may be employed as a game controller, or a general-purpose portable terminal such as a portable telephone, a smartphone, or a tablet may be employed as the game controller.

(a2: Game Controller)

Figure 2:
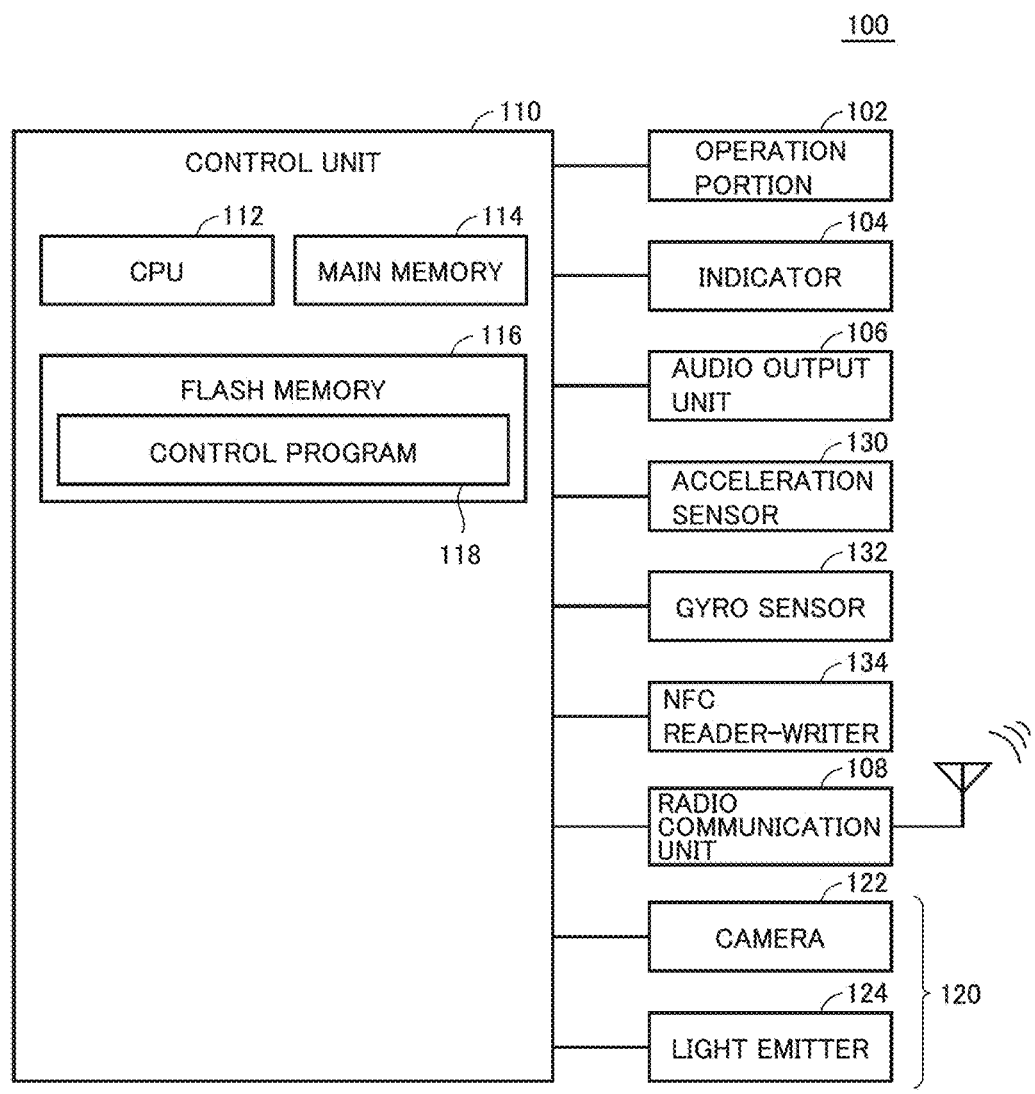
FIG. 2 shows an exemplary illustrative non-limiting drawing illustrating one example of a hardware configuration of a game controller shown in FIG. 1.

One example of a hardware configuration of game controller 100 shown in FIG. 1 will be described with reference to FIG. 2. Game controller 100 includes a control unit 110, an operation portion 102, an indicator 104, an audio output unit 106, a radio communication unit 108, an acceleration sensor 130, a gyro sensor 132, a near field radio communication (NFC) reader-writer 134, and image pick-up portion 120.

Control unit 110 is an entity which controls overall processing in controller 100 and includes as its main components, a central processing unit (CPU) 112, a main memory 114, and a flash memory 116 which stores a control program 118. CPU 112 representing one example of a processor implements various types of control as will be described later by reading control program 118 stored in flash memory 116 to main memory 114 and executing the control program.

Control unit 110 may be mounted as a system large scale integration (LSI) including the components described above.

Operation portion 102 accepts an operation by a user and outputs information representing a content of the operation by the user to control unit 110. Typically, operation portion 102 includes a push button, an operation lever, a touch panel, a mouse, and the like. Alternatively, a controller which is separate from controller 100 and connected through a wire or radio may be included as operation portion 102.

Indicator 104 is located as being exposed at a surface of controller 100 and gives a visual notification to a user in accordance with a command from control unit 110. Typically, indicator 104 includes a light emitting diode (LED) and the like.

Audio output unit 106 is located as being partially exposed at the surface of controller 100 and gives an auditory notification to a user in accordance with a command from control unit 110. Typically, audio output unit 106 includes one speaker or a plurality of speakers or the like.

Radio communication unit 108 exchanges a radio signal with another device in accordance with a command from control unit 110 and outputs data received from another device to control unit 110. Radio communication unit 108 includes a frequency generation circuit, a modulation circuit, a demodulation circuit, an encoding circuit, and the like which are not shown. Radio communication unit 108 may adopt a communication scheme in conformity with Bluetooth® under Institute of Electrical and Electronic Engineers (IEEE) 802.15 standards or wireless local area network (LAN) under IEEE 802.11 standards.

Acceleration sensor 130 detects an acceleration generated in controller 100 and outputs a result of detection to control unit 110. Gyro sensor 132 detects an inclination or the like of controller 100 and outputs a result of detection to control unit 110. At least one or both of acceleration sensor 130 and gyro sensor 132 can be used to detect at least one of an attitude and a motion of controller 100.

NFC reader-writer 134 is a communication unit which exchanges information through contactless communication with an integrated circuit (IC) tag (or an NFC tag) representing one example of a storage medium, and it writes data into an IC tag located in proximity and reads data stored in an IC tag. A configuration which can exchange data through a wireless signal should only be adopted, without being limited by the denotation "NFC".

Image pick-up portion 120 is a portion which receives light around controller 100 and generates image data, and is constituted of a camera 122 and a light emitter 124.

Camera 122 includes any image pick-up device such as a charge coupled device (CCD), a complementary metal oxide semiconductor (CMOS) image sensor, and a photodiode array. Light reception sensitivity of camera 122 should only be set as appropriate in accordance with a wavelength of light emitted from a subject, and an image pick-up device having light reception sensitivity in an infrared region is employed in the present embodiment by way of example. In this case, camera 122 can output image data corresponding to an intensity distribution of incident infrared rays. An infrared camera may be adopted as camera 122.

Light emitter 124 is a light source for emitting light to a subject in order to shoot the subject with camera 122. By way of example, any light emitting device such as a light emitting diode (LED) or a laser diode can be employed as light emitter 124. As described above, when camera 122 obtains an image in an infrared region, light emitter 124 is configured to emit infrared rays. Light emitter 124 can emit infrared (IR) rays to the subject. Light emitter 124 may also function similarly to a flash attached to a conventional camera.

(a3: Main Body)

Figure 3:
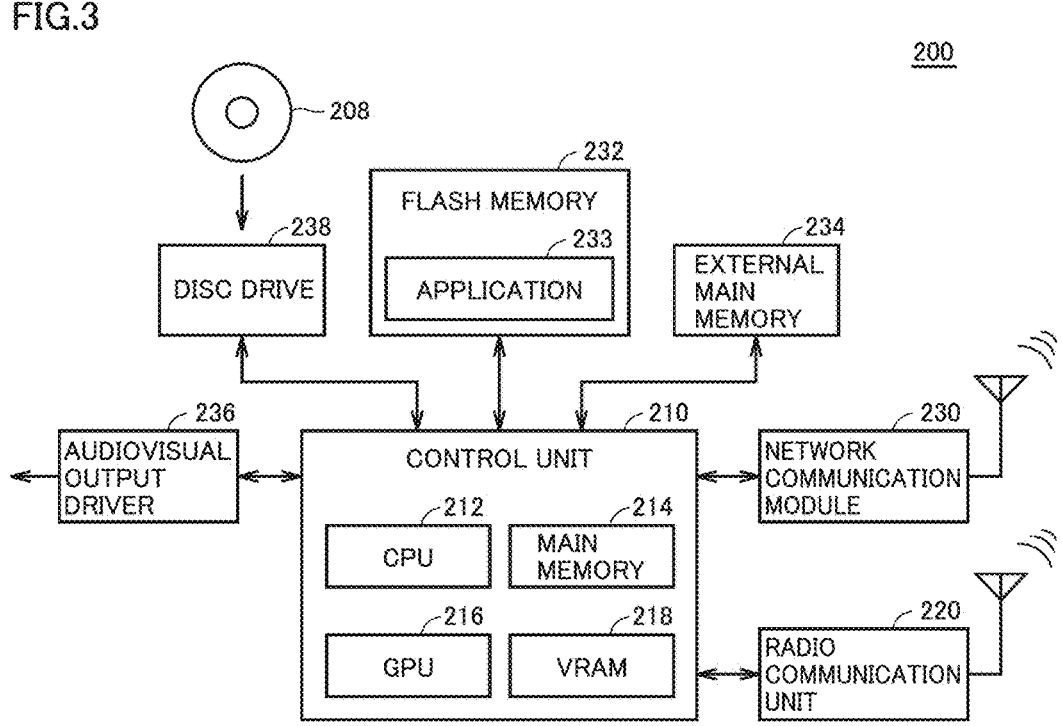
FIG. 3 shows an exemplary illustrative non-limiting drawing illustrating one example of a hardware configuration of a main body shown in FIG. 1.

One example of a hardware configuration of main body 200 shown in FIG. 1 will be described with reference to FIG. 3. Main body 200 represents one type of a computer and includes as its main components, a control unit 210, a radio communication unit 220, a network communication module 230, a flash memory 232, an external main memory 234, an audiovisual output driver 236, and a disc drive 238.

Control unit 210 is an entity which controls overall processing in main body 200 and includes as its main components, a CPU 212, a main memory 214, a graphical processing unit (GPU) 216, and a video random access memory (VRAM) 218. CPU 212 executes a basic system program or an application. Main memory 214 functions as a working memory which temporarily holds data necessary for execution of a program by CPU 212. GPU 216 performs processing mainly involved with representation. VRAM 218 functions as a working memory for showing an image generated in processing by GPU 216.

Control unit 210 may be mounted as a system large scale integration (LSI) including the components described above.

Radio communication unit 220 exchanges a radio signal with another device in accordance with a command from control unit 210 and outputs data received from another device to control unit 210. Typically, radio communication unit 220 exchanges information with controller 100. A more specific configuration of radio communication unit 220 is similar to that of radio communication unit 108 of controller 100 shown in FIG. 2.

Network communication module 230 includes various circuits for radio communication with a device such as an access point. Network communication module 230 may be mounted, for example, by using wireless local area network (LAN) under IEEE 802.11 standards, infrared communication, or mobile communication under long term evolution (LTE).

Since radio communication unit 220 and network communication module 230 both include a circuit for radio communication, they may be mounted on the same chip.

Flash memory 232 can be accessed from control unit 210 and holds a basic system program or an application in a non-volatile manner. For example, flash memory 232 may store various applications 233. Application 233 is read from an optical recording medium 208 by disc drive 238 and installed.

External main memory 234 may function as a working memory in coordination with main memory 214 in control unit 210.

Audiovisual output driver 236 outputs a video signal and an audio signal output from control unit 210 to display 204 (see FIG. 1).

<B. Overview of Attachment>

Figure 4A:
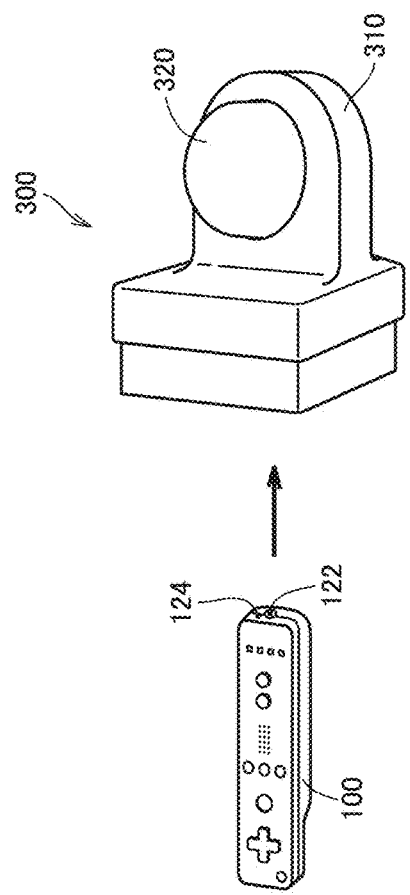
FIGS. 4A and 4B show exemplary illustrative non-limiting drawings illustrating one example of a form of use of an attachment according to the present embodiment.
Figure 4B:
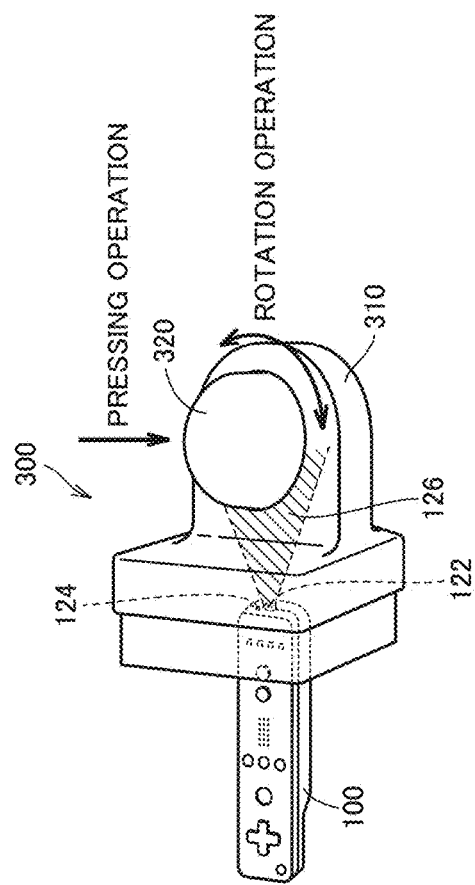

Overview of a structure or the like of an attachment according to the present embodiment will now be described. FIGS. 4A and 4B show one example of a form of use of an attachment 300 according to the present embodiment. Referring to FIG. 4A, attachment 300 is a member configured to allow various game operations, and it is basically constituted of a housing 310 and an operation portion 320 in housing 310. Operation portion 320 changes a position, a speed, an acceleration, an orientation, an angle, an attitude, and the like in accordance with an operation by a user. As shown in FIG. 4B, controller 100 is attached to attachment 300, change generated in operation portion 320 is detected based on an image obtained by shooting with camera 122 of controller 100, and operation data is generated based on detected change. A support portion which supports controller 100 is provided in housing 310, although not clearly shown in FIG. 4B.

Attachment 300 should only be provided with a space to some extent in the inside. Therefore, a paper material such as a corrugated cardboard may be used for housing 310, in addition to a metal material such as iron or aluminum or a resin material such as plastics.

In attachment 300 shown in FIGS. 4A and 4B, a part of spherical operation portion 320 is rotatably engaged with an opening in housing 310. A user can perform an operation to press operation portion 320 (a pressing operation) and an operation to rotate operation portion 320 (a rotation operation). Attachment 300 includes a button mechanism and a rotation mechanism. A configuration provided with only any one of the pressing operation and the rotation operation may be adopted.

A rotation operation and/or a pressing operation performed onto operation portion 320 by the user can be detected from an image obtained by shooting with camera 122 of controller 100. As shown in FIG. 4B, a member which is changed in coordination with a part of operation portion 320 or operation portion 320 is located in a field of view of shooting 126 with camera 122 of controller 100, and an operation by the user is detected by shooting at least any element. Typically, a direction of an operation to press operation portion 320 (a pressing operation), that is, a direction of a motion of a button mechanism, is perpendicular to the direction of shooting (a direction of a point of view) of camera 122.

Thus, attachment 300 according to the present embodiment functions as a kind of a game controller or an input device which detects any operation by the user by being attached to controller 100 with camera 122.

<C. Marker in Attachment>

A mechanism for detecting an operation by a user through shooting with camera 122 of controller 100 will now be described. Attachment 300 according to the present embodiment is configured such that respective regions where two types of indications different in function (hereinafter also referred to as a "marker") are seen are located in an image generated by shooting with camera 122 of controller 100.

More specifically, in attachment 300, a marker is located such that a position thereof is maintained regardless of an operation onto operation portion 320 (hereinafter also referred to as a "static marker" for distinction) as a first indication and a marker is located such that a position thereof is variable in accordance with an operation onto operation portion 320 (hereinafter also referred to as a "movable marker" for distinction) as a second indication. In addition to these two types of markers, yet another marker may be located.

The static marker which is the first indication is used for detecting a state of connection, a type, or displacement in installation of attachment 300 when viewed from controller 100 and it is an "immobile marker" so to speak. The movable marker which is the second indication is used for detecting a motion of operation portion 320 of attachment 300 when viewed from controller 100 and it is a "mobile marker" so to speak.

The "indication" or the "marker" herein collectively refers to a member or a region which has a visual or optical feature different from other regions, and it may also be in a form achieving only a function provided to each marker as described above or a form achieving also other functions. The "indication" or the "marker" herein may be mounted in any form so long as it allows camera 122 of controller 100 to detect a specific position or region.

Figure 5A:
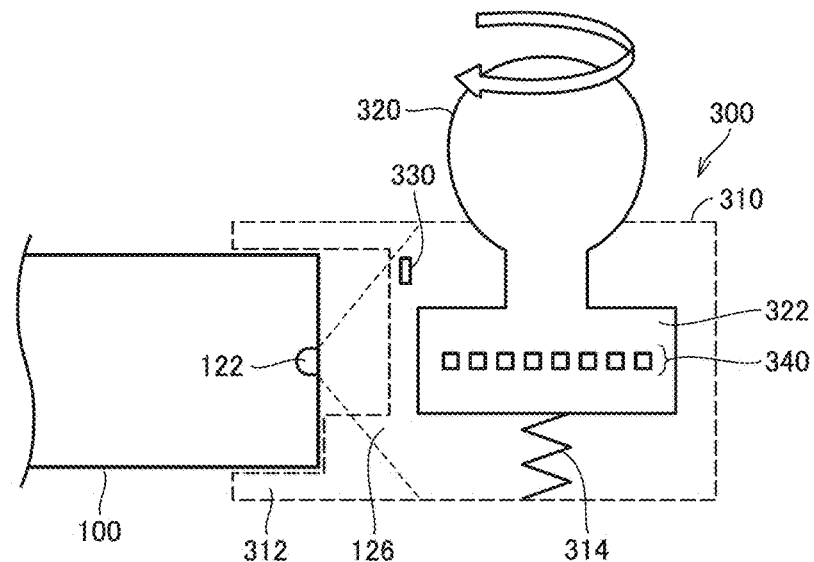
FIGS. 5A and 5B show exemplary illustrative non-limiting drawings illustrating a method for detecting an operation by a user onto the attachment according to the present embodiment.
Figure 5B:
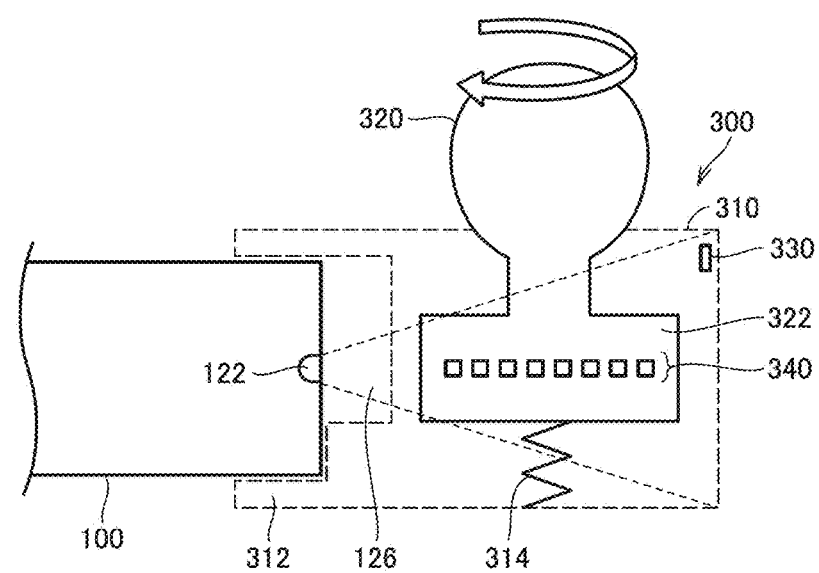

A method for detecting an operation by a user onto attachment 300 according to the present embodiment will be described with reference to FIGS. 5A and 5B. FIG. 5A shows an example in which a static marker 330 is located at a position closer to camera 122 than a movable marker 340, and FIG. 5B shows an example in which movable marker 340 is located at a position closer to camera 122 than static marker 330.

Referring to FIG. 5A, an opening is provided at one end of attachment 300 and controller 100 is attached to the opening. Coupling between controller 100 and attachment 300 may be fine or coarse. In attachment, a support portion 312 formed in a part of housing 310 of attachment 300 supports controller 100. Any structure of support portion 312 may be adopted so long as the structure can support controller 100 such that a direction of shooting of camera 122 of controller 100 is oriented to the inside of housing 310. Support portion 312 may be constructed to be in a shape in conformity with a shape of a housing 310 of attachment 300.

As controller 100 is positioned by support portion 312 of housing 310, a member located in housing 310 is located as a subject in field of view of shooting with camera 122 of controller 100.

More specifically, in housing 310 of attachment 300, static marker 330 attached to a part of housing 310 and movable marker 340 on an outer circumferential surface of a cylindrical portion 322 formed integrally with operation portion 320 are located. When a user operates operation portion 320, cylindrical portion 322 formed integrally with operation portion 320 is also moved in coordination and hence a position of movable marker 340 on the outer circumferential surface of cylindrical portion 322 is changed. In contrast, since static marker 330 is fixed to housing 310 independently of operation portion 320 and cylindrical portion 322, a position thereof is maintained regardless of an operation onto operation portion 320. Though FIGS. 5A and 5B show configuration examples in which cylindrical portion 322 is formed integrally with operation portion 320, it is not necessarily required to construct these members integrally with each other, and cylindrical portion 322 should only be in coordination with operation portion 320 by adopting any link mechanism or the like.

Thus, operation portion 320 has cylindrical portion 322 as a movable member at a position in housing 310, with a position thereof being variable in accordance with an operation onto operation portion 320.

As shown in FIGS. 5A and 5B, biasing means such as a spring 314 for generating force against an operation by the user to press operation portion 320 (a pressing operation) may be employed Attachment 300 shown in FIGS. 5A and 5B includes a biasing mechanism which resists against an operation onto operation portion 320. By adopting such a biasing mechanism, such a motion of a button as movement of operation portion 320 downward only while the user presses the button can be realized.

The configuration shown in FIG. 5A is suitable, in particular, for an example in which a field of view of camera 122 is wide. In contrast, the configuration shown in FIG. 5B is suitable for an example in which a field of view of camera 122 is relatively narrow. More specifically, in the configuration shown in FIG. 5B, static marker 330 is fixed in the rear of cylindrical portion 322 where movable marker 340 is located when viewed from camera 122. In the configuration shown in FIG. 5B as well, a position of movable marker 340 is changed in accordance with an operation by the user onto operation portion 320, whereas a position of static marker 330 is maintained regardless of an operation by the user onto operation portion 320.

In any of FIGS. 5A and 5B, support portion 312 in housing 310 supports controller 100 such that field of view of shooting 126 with camera 122 of controller 100 includes a region including static marker 330 (first indication) in housing 310 as a subject and a region including movable marker 340 (second indication) in housing 310 as a subject. Static marker 330 and movable marker 340 may be located such that a direction of shooting (a direction of a point of view) with camera 122 is different.

Figure 6A:
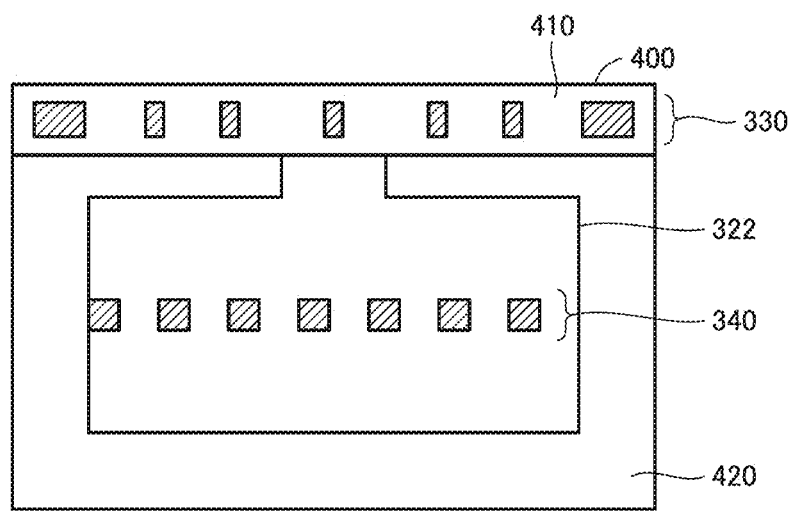
FIGS. 6A and 6B show exemplary illustrative non-limiting drawings illustrating examples of a camera image obtained by image pick-up with a camera of the game controller in the configuration shown in FIGS. 5A and 5B.

One example of an image (hereinafter also referred to as a "camera image") obtained as a result of image pick-up by camera 122 of game controller 100 in the configuration shown in FIGS. 5A and 5B will be described with reference to FIGS. 6A and 6B. Typically, an infrared image or an IR image is employed as the camera image. Referring to FIG. 6A, a camera image 400 includes a region in which static marker 330 is seen as a subject (hereinafter also referred to as a "static marker region 410" for distinction) in an upper portion thereof and a region in which movable marker 340 is seen as a subject (hereinafter also referred to as a "movable marker region 420" for distinction) in a central portion thereof. In the example shown in FIG. 6A, a part of cylindrical portion 322 where movable marker 340 is located is also seen as a subject in movable marker region 420.

Figure 6B:
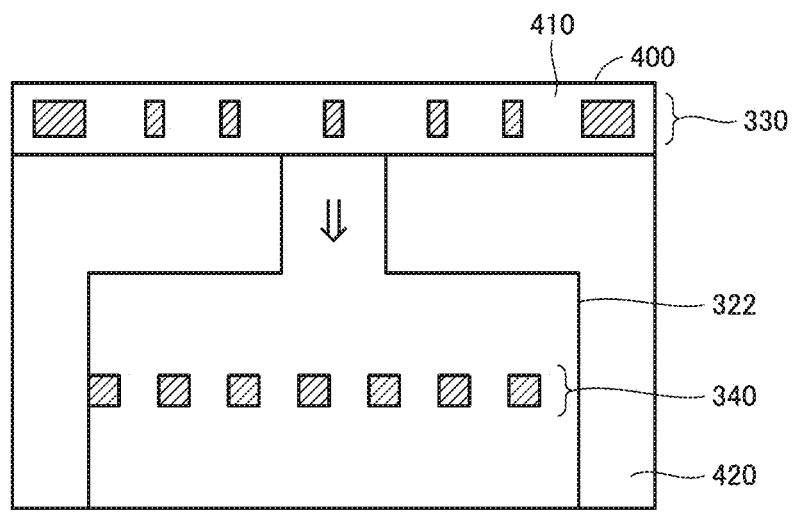

FIG. 6B shows an example of camera image 400 picked up while operation portion 320 of attachment 300 is pressed by the user. As the user performs the pressing operation onto operation portion 320, in camera image 400, movable marker 340 which is the subject moves downward in movable marker region 420. By setting movable marker region 420 in advance, whether or not the user has performed a pressing operation onto operation portion 320 can be detected based on at which position movable marker 340 is located in set movable marker region 420.

When the user performs a rotation operation onto operation portion 320, movable marker 340 moves in a horizontal direction in movable marker region 420 and hence whether or not the user has performed a rotation operation onto operation portion 320 and/or a degree of the rotation operation can be detected based on expression of movement in the horizontal direction.

As shown in FIGS. 6A and 6B, static marker 330 is located on an outer peripheral side in field of view of shooting 126 with camera 122, and movable marker 340 is located on an inner side relative to static marker 330 in field of view of shooting 126 with camera 122. Without being limited to such arrangement, movable marker region 420 can more readily be specified by arranging static marker 330 on the further outer peripheral side relative to movable marker 340.

An operation by the user onto operation portion 320 can be detected by detecting a position or a motion of a pattern corresponding to movable marker 340 in movable marker region 420. Thus, static marker 330 used for specifying movable marker region 420 contains information indicating a reference position for detecting variation in position by an operation by the user onto operation portion 320.

<D. Processing for Detecting Marker>

Processing for detection with the two types of markers according to the present embodiment will now be described.

When attachment 300 according to the present embodiment is used, processing for detecting a marker stepwise is performed. Specifically, static marker region 410 is specified in a camera image and movable marker region 420 is specified based on a position of specified static marker region 410. Then, an operation by the user onto operation portion 320 is detected based on a motion of movable marker 340 which appears in specified movable marker region 420.

Figure 7A:
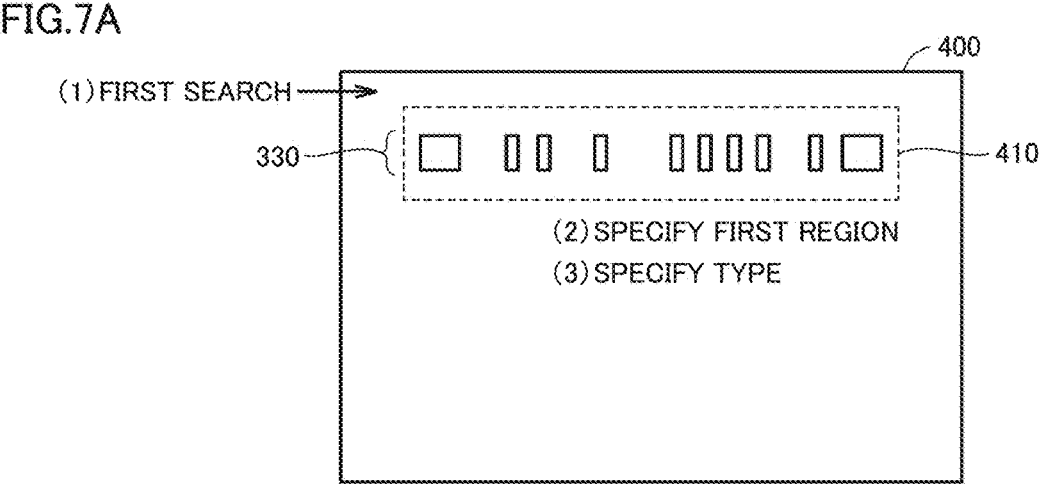
FIGS. 7A to 7C show exemplary illustrative non-limiting drawings illustrating a procedure of processing for detecting a marker with the attachment according to the present embodiment.

A procedure of processing for detecting a marker with attachment 300 according to the present embodiment will be described with reference to FIGS. 7A to 7C. Referring to FIG. 7A, processing for searching camera image 400 obtained by shooting with camera 122 of game controller 100 for a pattern corresponding to static marker 330 is performed ((1) first search). A region where static marker 330 is seen is detected. Then, when a pattern corresponding to static marker 330 is detected, static marker region 410 is set in accordance with a position or a region of the detected pattern ((2) set first region). A type of attached attachment 300 is specified based on the detected pattern ((3) specify type).

Figure 7B:
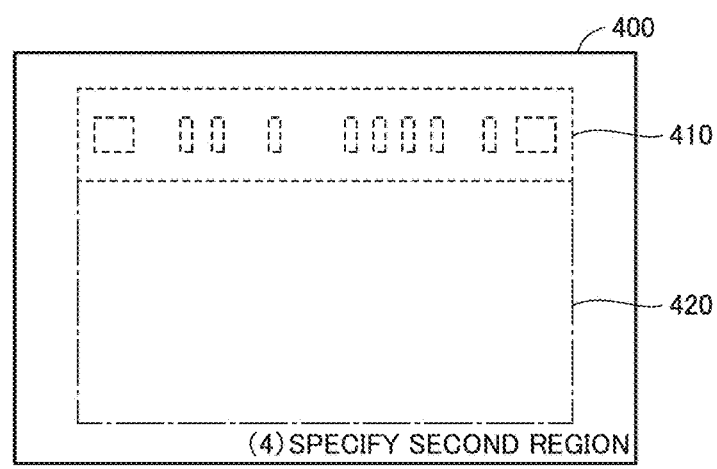

As shown in FIG. 7B, movable marker region 420 is set in accordance with predetermined positional relation with set static marker region 410 being defined as the reference ((4) set second region). Then, as shown in FIG. 7C, processing for searching set movable marker region 420 for a pattern corresponding to movable marker 340 is performed ((5) second search). A region other than movable marker region 420 in camera image 400 is excluded from a search target area. Depending on required search performance or search capability, a region other than movable marker region 420 does not have to be excluded from a search target area.

By thus using attachment 300 according to the present embodiment, markers can stepwise be detected at least for each of static marker region 410 where static marker 330 is seen and movable marker region 420 where movable marker 340 is seen. By thus adopting processing for detecting markers stepwise for each region, processing for detecting a marker can be realized without lowering in detection speed and detection accuracy even though the number of markers which can be detected in one search processing is restricted.

Processing for specifying a portion (which is an assembly of pixels and also called a "cluster") different in color from other regions included in a camera image is used for processing for searching for a pattern. In the processing for searching for a cluster, a position of the center of gravity of a cluster, a size of a cluster, and a region containing a cluster (typically, an upper left coordinate and a lower right coordinate of the region) are detected from an input camera image.

An example in which the number of markers which can be detected in one search processing is restricted may be assumed as such an example that there is an upper limit for the number of clusters which can simultaneously be searched for in such processing for detecting a cluster. In such a case, if one attempts simultaneous search for static marker 330 and movable marker 340, one may not be able to detect all markers at once due to restriction on the upper limit for detected clusters. In contrast, by adopting a method as shown in FIGS. 7A to 7C, a region set in each step can be searched for markers as many as possible within a range allowable in a system. In other words, it is not necessary to take into account both of static marker 330 and movable marker 340 but any pattern can be adopted for each of static marker 330 and movable marker 340 within a range not exceeding the upper limit number in a system.

<E. Overall Processing Procedure in Game System>

An overall processing procedure for detecting an operation by a user onto operation portion 320 of attachment 300 and performing various types of information processing in game system 1 according to the present embodiment will now be described.

As described with reference to FIGS. 7A to 7C, in the present embodiment, static marker region 410 is set for a camera image obtained by shooting with camera 122, and in succession, movable marker region 420 is set. An operation by the user onto operation portion 320 is detected based on a partial image corresponding to set movable marker region 420 in the camera image, and operation data representing a content of the detected operation by the user is generated. Such a series of processes can be distributed between controller 100 and main body 200 or also one of them can perform entire processing. Typically, manners as below are assumed:

(a) Execution only by controller 100;
(b) Transmission of camera image 400 picked up by controller 100 to main body 200 and execution in main body 200; and
(c) Execution in cooperation by controller 100 and main body 200.

One manner of execution in cooperation by controller 100 and main body 200 will be described below as a typical example. Any form of mounting, however, can be adopted depending on a configuration, processing capability, and required performance of the game system, without being limited to a processing procedure shown below.

Overview of processing for generating operation data in game system 1 according to the present embodiment will be described with reference to FIG. 8. Initially, camera image 400 is obtained by shooting with camera 122 of controller 100. Controller 100 has a function to transmit image data obtained by shooting with camera 122 to main body 200, and camera image 400 obtained by controller 100 is transmitted to main body 200.

Main body 200 sets static marker region 410 by searching camera image 400 from controller 100 for a static marker and sets movable marker region 420 with set static marker region 410 being defined as the reference. Thus, main body 200 performs processing involved with initial setting based on an image of a portion corresponding to static marker region 410 included in camera image 400. Then, main body 200 transmits movable marker region specifying information representing a position and a range of movable marker region 420 set for camera image 400 to controller 100.

Controller 100 extracts a partial image of a region corresponding to movable marker region 420 in camera image 400 obtained by shooting with camera 122 in accordance with the movable marker region specifying information received from main body 200, and transmits the partial image to main body 200. Controller 100 has an extraction function to extract a part of the entire image shot with camera 122 and to generate a partial image.

Main body 200 performs processing for searching the partial image corresponding to movable marker region 420 for a movable marker and detects an operation by the user onto the operation portion of the attachment (operation detection processing). Main body 200 generates operation data representing a content of the detected operation by the user and proceeds with game processing based on the generated operation data. Thus, main body 200 performs processing for generating operation data based on an image of a portion corresponding to movable marker region 420 included in camera image 400 and a result of processing involved with previous initial setting.

In main body 200, different game processing is performed depending on a type of attached attachment 300. Specifically, different operation data may be generated depending on a type of specified attachment 300, or different game processing may be performed on the same operation data depending on a type of specified attachment 300.

Figure 9:
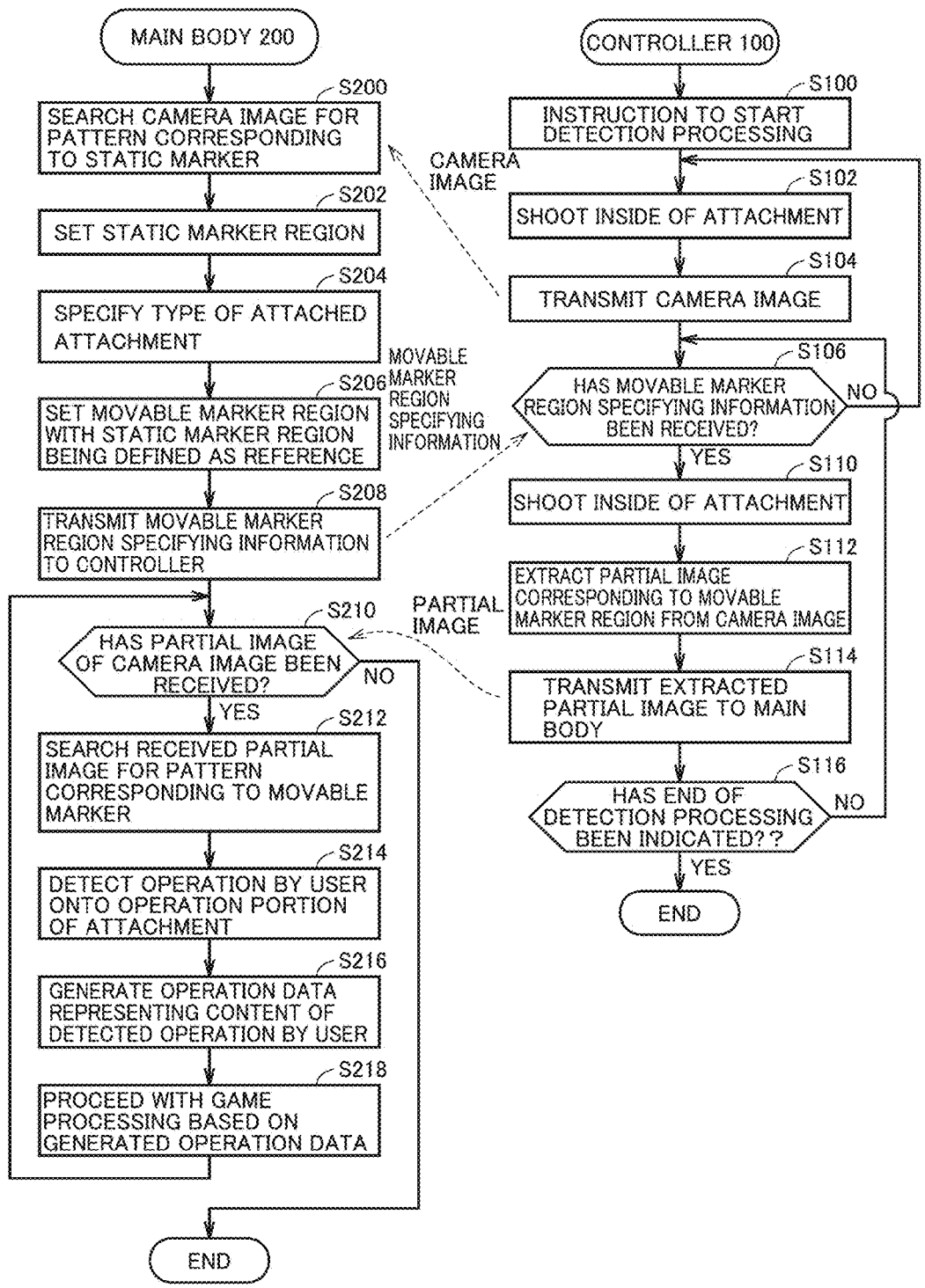
FIG. 9 shows an exemplary illustrative non-limiting drawing illustrating a procedure of processing for detecting a marker with the attachment according to the present embodiment.

A procedure of processing for detecting a marker with attachment 300 according to the present embodiment will be described with reference to FIG. 9. Each step in connection with controller 100 shown in FIG. 9 is typically performed by execution of control program 118 by CPU 112 of controller 100 (see FIG. 2 for all of these elements). Each step in connection with main body 200 shown in FIG. 9 is performed by execution of a basic system program or application 233 by CPU 212 of main body 200 (see FIG. 3 for all of these elements).

When start of detection processing for attachment 300 is indicated (step S100), controller 100 activates camera 122 and shoots the inside of attachment 300 with camera 122 (step S102). In shooting in step S102, a shooting condition suitable for detection of static marker 330 is preferably set. Change in shooting condition will be described later.

Controller 100 transmits camera image 400 obtained by shooting with camera 122 to main body 200 (step S104).

Main body 200 searches camera image 400 received from controller 100 for a pattern corresponding to static marker 330 (step S200). When main body 200 detects a pattern corresponding to static marker 330, it sets static marker region 410 in accordance with a position or a region of the detected pattern (step S202), specifies a type of attached attachment 300 (step S204), and sets movable marker region 420 in accordance with predetermined positional relation with set static marker region 410 being defined as the reference (step S206). Then, main body 200 transmits movable marker region specifying information representing a position and a range of set movable marker region 420 to controller 100 (step S208). Thus, main body 200 generates the movable marker region specifying information specifying movable marker region 420 as processing in connection with initial setting and transmits the movable marker region specifying information to controller 100.

Controller 100 determines whether or not it has received the movable marker region specifying information from main body 200 (step S106). When the controller has not received the movable marker region specifying information from main body 200 (NO in step S106), the processing in step S102 or later is repeated.

When controller 100 has received the movable marker region specifying information from main body 200 (YES in step S106), controller 100 shoots the inside of attachment 300 with camera 122 (step S110). In shooting in step S110, a shooting condition suitable for detection of movable marker 340 is preferably set. Change in shooting condition will be described later. Then, controller 100 extracts a partial image corresponding to movable marker region 420 designated by the movable marker region specifying information from main body 200 from camera image 400 obtained by shooting with camera 122 (step S112) and transmits the extracted partial image to main body 200 (step S114). Thus, controller 100 generates a partial image corresponding to movable marker region 420 based on the movable marker region specifying information and transmits the partial image to main body 200.

Controller 100 determines whether or not end of detection processing for attachment 300 has been indicated (step S116). When end of the detection processing for attachment 300 has not been indicated (NO in step S116), processing in step S106 or later is repeated. When end of the detection processing for attachment 300 has been indicated (YES in step S116), the process ends.

Main body 200 determines whether or not it has received a partial image of camera image 400 from controller 100 (step S210). When the main body has received the partial image of camera image 400 from controller 100 (YES in step S210), main body 200 searches the received partial image for a pattern corresponding to movable marker 340 (step S212). Main body 200 detects an operation by the user onto the operation portion of the attachment based on a position and variation in position of the pattern corresponding to found movable marker 340 (step S214). Main body 200 generates operation data representing a content of the detected operation by the user (step S216) and proceeds with game processing based on the generated operation data (step S218). Then, processing in step S210 or later is repeated. Thus, main body 200 performs operation detection processing based on a partial image corresponding to movable marker region 420.

When the main body has not received a partial image of camera image 400 from controller 100 (NO in step S210), the process ends.

Processing for extracting an image of a portion corresponding to movable marker region 420 from camera image 400 may be performed by main body 200. In this case, camera images 400 are successively transmitted from controller 100 to main body 200 and main body 200 performs processing for detecting an operation by the user only for a partial image corresponding to movable marker region 420 set in received camera image 400. Thus, a function to extract a partial image necessary for processing involved with initial setting and operation detection processing from camera image 400 from controller 100 may be mounted on main body 200.

<F. Shape and Application of Pattern of Marker>

A shape and an application of a pattern of static marker 330 and movable marker 340 will now be described.

(f1: Pattern of Static Marker 330)

Static marker 330 is used for detecting a state of connection, a type, or displacement of installation of attachment 300 when viewed from controller 100.

Figure 10A:
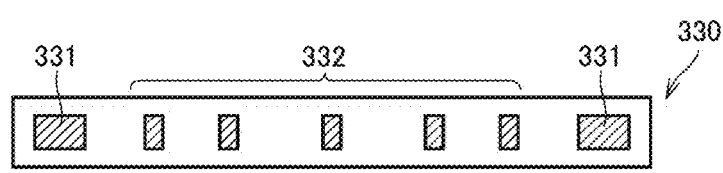
FIGS. 10A and 10B show exemplary illustrative non-limiting drawings illustrating examples of a pattern of a static marker used in the attachment according to the present embodiment.
Figure 10B:
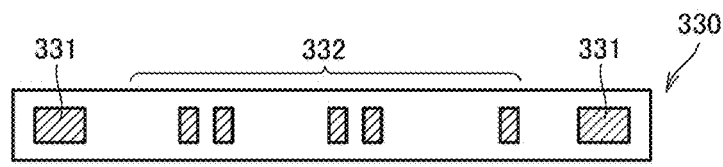

One example of a pattern of static marker 330 used in attachment 300 according to the present embodiment will be described with reference to FIGS. 10A and 10B. Referring to FIGS. 10A and 10B, static marker 330 includes a position reference marker 331 and an identification marker 332. Rectangular regions of position reference markers 331 are spaced apart from each other by a predetermined distance. Each rectangular region forming position reference marker 331 is greater than each rectangular region forming identification marker 332. A region where position reference marker 331 is seen is specified in a camera image obtained by shooting with camera 122 based on characteristics of such a rectangular region.

Position reference marker 331 serves as a criterion as to whether or not attachment 300 is attached. For example, presence of attachment 300 may be detected based on whether or not at least one position reference marker 331 is detected.

Figure 7C:
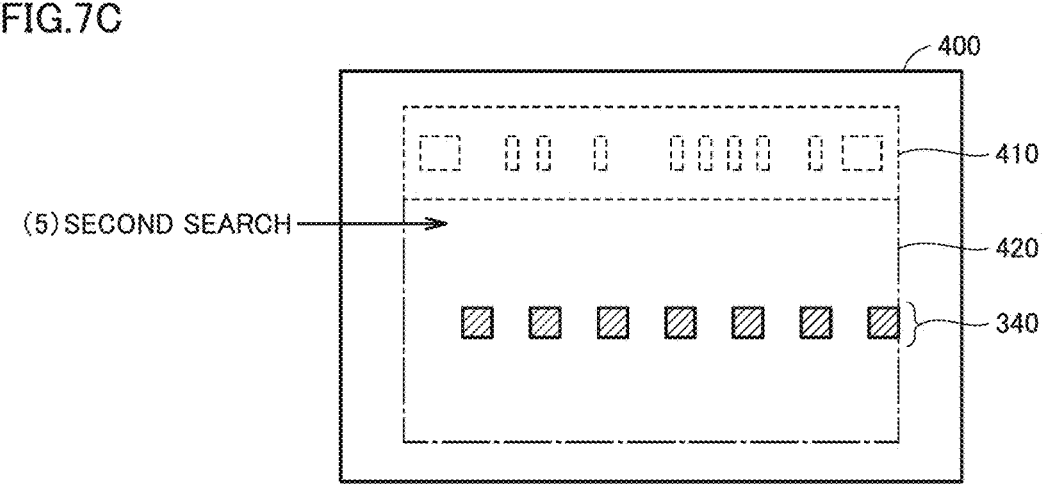

Position reference marker 331 serves as a positional reference for setting static marker region 410 and movable marker region 420 within a camera image (see FIGS. 7A to 7C for any of the regions). Whether or not attachment 300 is attached to controller 100 can also be determined based on whether or not a pattern corresponding to position reference marker 331 could be detected in the camera image.

Thus, position reference marker 331 includes position reference marker 331 as information for detecting presence of attachment 300. Both or only one of position reference marker 331 and identification marker 332 may be used as information for detecting presence of attachment 300.

Whether or not attachment 300 has been detached can be determined with a method as below. When transition from a state that one of position reference markers 331 as static marker 330 is detected without fail to a state that no position reference marker 331 can be detected or recognized is made, it may be determined that attachment 300 has been detached. Alternatively, a marker of which position is maintained regardless of an operation onto operation portion 320 may be included as a part of movable marker 340, and when transition to a state that such a marker is not detected is made, it may be determined that attachment 300 has been detached.

Identification marker 332 represents individual information such as a type, a serial number, or an attribute of attachment 300. FIGS. 10A and 10B show examples of respective static markers 330 added to attachments 300 different in type. As can be seen based on comparison between FIGS. 10A and 10B, patterns of identification marker 332 are different from each other and represent information specific to attachment 300 corresponding to each pattern. Thus, position reference marker 331 may include identification marker 332 as information for specifying a type of attachment 300.

Thus, identification marker 332 may include individual information such as a type, a serial number, or an attribute of each attachment 300.

Figure 11A:
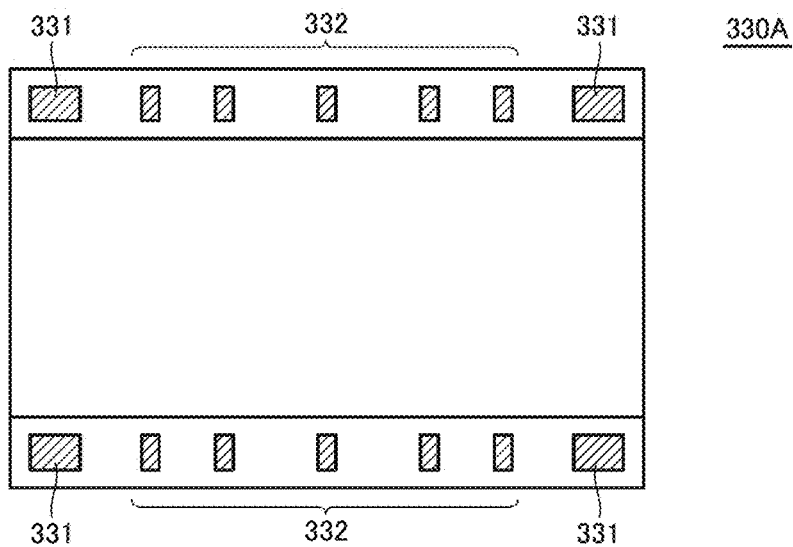
FIGS. 11A and 11B show exemplary illustrative non-limiting drawings illustrating modifications of the static marker used in the attachment according to the present embodiment.
Figure 11B:
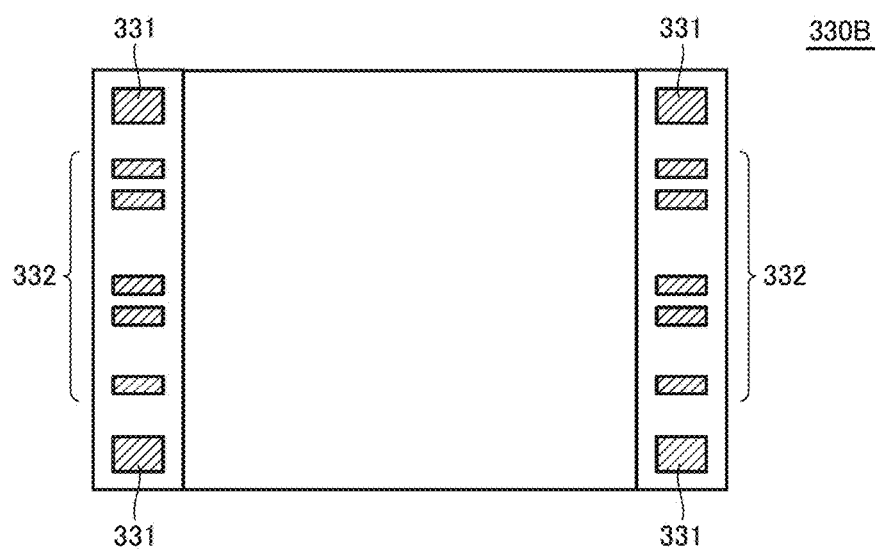

FIGS. 11A and 11B show modifications of the static marker used in attachment 300 according to the present embodiment.

Referring to FIG. 11A, in a static marker 330A representing one modification, position reference marker 331 is located at each of four corners. By arranging position reference marker 331 at each of four corners, setting of static marker region 410 and associated setting of movable marker region 420 can be facilitated. By arranging position reference marker 331 at each of four corners, in addition to ends in the left-right direction of movable marker region 420 but also ends in the up-down direction of movable marker region 420 can more readily be detected. Two position reference markers 331 may be located on a diagonal.

Identification marker 332 which extends in the left-right direction is adopted for static marker 330A shown in FIG. 11A. When identification marker 332 shown in FIG. 11A is adopted, it is more suitable for detection of operation portion 320 which moves in the left-right direction.

Referring to FIG. 11B, in a static marker 330B representing another modification as well, position reference marker 331 is located at each of four corners. A pattern which extends in the up-down direction is adopted for identification marker 332. When identification marker 332 shown in FIG. 11B is adopted, it is more suitable for detection of operation portion 320 which moves in the up-down direction.

When a static marker as shown in FIGS. 10A, 10B, 11A, and 11B is employed, position reference marker 331 and identification marker 332 may be detected in multiple stages. For example, in the processing in steps S102 and S110 in FIG. 9, static marker region 410 may be set by detecting a pattern corresponding to position reference marker 331 in the camera image. Then, by detecting a pattern corresponding to identification marker 332 within the camera image, a type of attached attachment 300 may be specified, and movable marker region 420 may be set in accordance with the specified type with static marker region 410 being defined as the reference (step S206 in FIG. 9).

By adopting such detection processing in multiple stages, accuracy in detection of position reference marker 331 can be enhanced and accuracy in setting of static marker region 410 and movable marker region 420 can be enhanced.

(f2: Reflectance of Static Marker 330 and Movable Marker 340)

In attachment 300 according to the present embodiment, as described above, two types of markers are located so as to be seen within the same camera image. When a camera image is divided into two or more regions and a marker is located in each region, a size of each region may be restricted, a marker which should be located in a certain region may be seen in another region due to position displacement or the like, and erroneous detection may be caused.

Possibility of erroneous detection may be lowered by making static marker 330 and movable marker 340 differ in reflectance from each other and shooting the marker under a shooting condition in accordance with each reflectance.

Figure 12A:
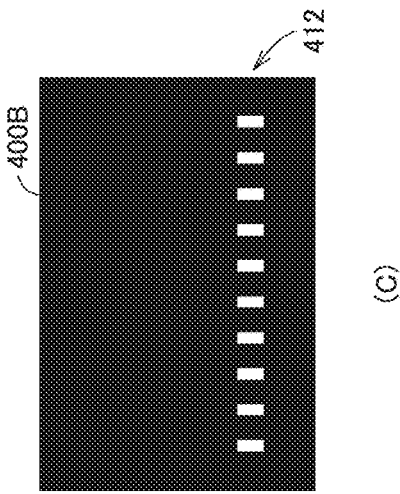
FIGS. 12A to 12C show exemplary illustrative non-limiting drawings illustrating other examples of the marker used in the attachment according to the present embodiment.
Figure 12B:
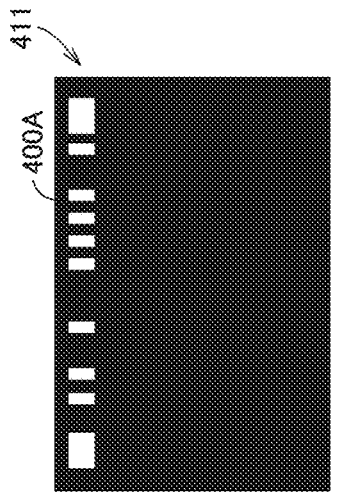
Figure 12C:
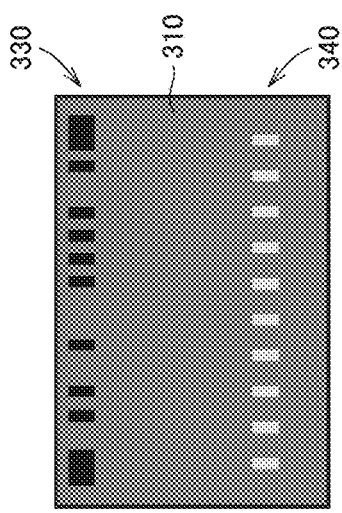

FIGS. 12A to 12C show other examples of a marker used in attachment 300 according to the present embodiment. FIGS. 12A to 12C show a state that static marker 330 and movable marker 340 are shot with camera 122 for the sake of convenience of description.

Referring to FIG. 12A, static marker 330 and movable marker 340 are different from each other in reflectance to a certain extent at a wavelength to which camera 122 has light reception sensitivity. Since an inner surface of housing 310 is also seen in a camera image shot with camera 122, three different reflectances (or ranges of reflectances) should be set with a reflectance of the inner surface of housing 310 being included.

From a point of view of detection accuracy, a marker higher in reflectance and a marker lower in reflectance than housing 310 are preferably located.

By way of example, a reflectance of static marker 330 can be set to be lowest and a reflectance of movable marker 340 can be set to be highest. In other words, static marker 330 can be made of a "black" material and movable marker 340 can be made of a "white" material. In this case, the inside of housing 310 should only be made of a material lighter in color than the "black" material.

Any reflective material can be employed as the "white" material. A retro-reflective material is more preferred as the reflective material. A generally commercially available material can be employed as the retro-reflective material, or a material for a highlighter or the like may be made use of Thus, at least one of static marker 330 and movable marker 340 is preferably made of a reflective material. When both of the markers are made of the reflective material, they should only significantly be different from each other in reflectance.

In actual shooting, light emitter 124 emits IR rays and camera 122 receives the reflected rays. In the example described above, static marker 330 has a lower reflectance to IR rays from light emitter 124 than the reflectance of movable marker 340 to IR rays from light emitter 124.

By thus arranging static marker 330 and movable marker 340 different in reflectance from each other, in detection of the markers, they can be separated from each other based on a quantity of reflected light. In the typical example described above, the inner surface of housing 310 has an intermediate reference to IR rays from light emitter 124 between a reflectance of static marker 330 to IR rays from light emitter 124 and a reflectance of movable marker 340 to IR rays from light emitter 124.

FIG. 12B shows one example of a result of setting intensity of IR rays emitted from light emitter 124 to relatively be high and reversing negative and positive (black and white) of an image shot with camera 122. Under the shooting condition shown in FIG. 12B, intensity of emitted IR rays is high and hence IR rays may sufficiently be reflected not only by movable marker 340 high in reflectance but also by the inner surface of housing 310. Therefore, only a region of a pattern 411 corresponding to static marker 330 is unable to obtain sufficient reflected rays and in a "black" state, while other regions are in a "white" state. A camera image 400A shown in FIG. 12B results from reversing negative and positive of the camera image in such a state. In camera image 400A, pattern 411 can be distinguished from other regions.

FIG. 12C shows one example of a result of shooting with intensity of IR rays emitted from light emitter 124 being set to relatively be low. Under the shooting condition shown in FIG. 12C, intensity of emitted IR rays is low and hence IR rays with detectable intensity may be obtained only from movable marker 340 high in reflectance. Therefore, in a camera image 400B shown in FIG. 12C, only a region of a pattern 412 corresponding to movable marker 340 can be distinguished from other regions.

By thus making static marker 330 and movable marker 340 differ in reflectance from each other, accuracy in detection of each marker can be enhanced. Furthermore, detection accuracy can further be enhanced by adjusting a shooting condition in detection of each marker. By way of example of a shooting condition, intensity of IR rays emitted from light emitter 124, a time period for exposure of camera 122, or a gain of camera 122 can be adjusted. One of these three factors may be adjusted, or two or more of them may be adjusted in combination. Adjustment of a shooting condition will be described below.

FIGS. 13A to 13D are diagrams for illustrating a method of adjusting a shooting condition in shooting static marker 330 and movable marker 340 with camera 122. Normally, a luminance value corresponding to intensity of light received for each pixel is selected from a certain range of gray scale values for camera 122. For example, when a luminance value of each pixel is determined in a 256-level gray scale, a camera image is a 256-level gray scale image. By binarizing this gray scale image based on any threshold value, a monochrome image can be generated.

As described above, static marker 330, movable marker 340, and housing 310 are different in reflectance (or range of reflectances) from one another, and their reflectances (or ranges of reflectances) are set not to overlap with one another.

Figure 13A:
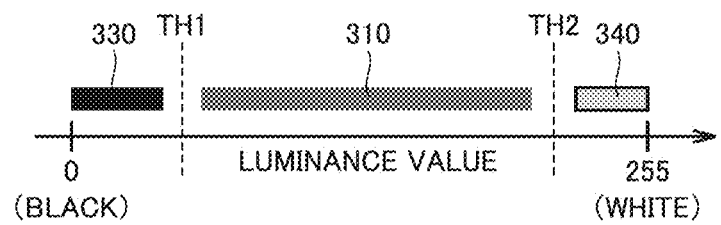
FIGS. 13A to 13D show exemplary illustrative non-limiting drawings illustrating a method of adjusting a shooting condition in shooting the static marker and a movable marker with the camera.

FIGS. 13A to 13D show distributions of luminance values obtained when an image of each of static marker 330, movable marker 340, and housing 310 is picked up with camera 122. FIG. 13A shows an ideal distribution of luminance values, in which intensities of reflected light from static marker 330, movable marker 340, and housing 310 can be separated from one another. By applying threshold values TH1 and TH2 for a luminance value, respective regions of static marker 330 and movable marker 340 can be detected. When a distribution of luminance values shown in FIG. 13A is obtained, regions of static marker 330 and movable marker 340 can simultaneously be detected in only one shooting.

Figure 13B:
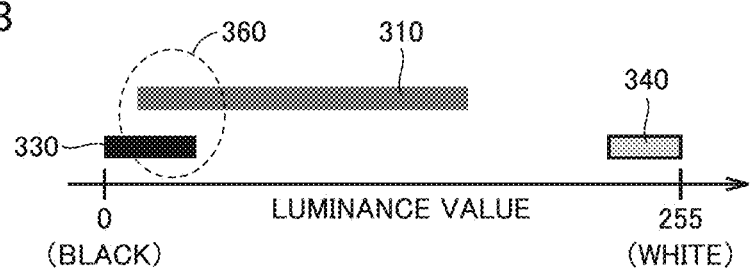

A luminance value resulting from light reception by camera 122 may not be in conformity with a reflectance of each substance due to variation in intensity of IR rays emitted from light emitter 124 or variation in reflectance at a surface of a substance. In FIG. 13B, intensity of reflected light from housing 310 is low and present as being mixed with intensity of a reflectance of static marker 330 (see a mixed region 360 in FIG. 13B).

When a situation as in FIG. 13B may occur, accuracy in detection of each marker can be enhanced by shooting static marker 330 and movable marker 340 under shooting conditions different from each other.

Figure 13C:
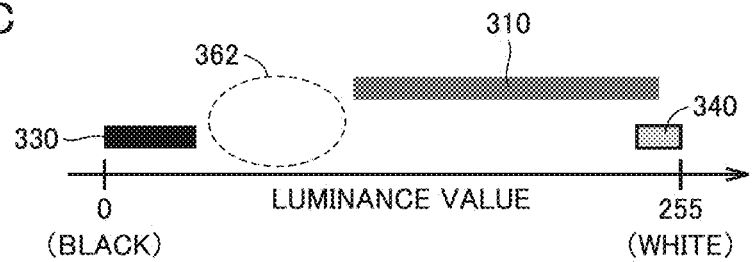

FIG. 13C shows a distribution of luminance values in a camera image obtained by shooting with intensity of IR rays emitted from light emitter 124 being set to relatively be high. Under such a shooting condition, intensity of reflected light from housing 310 in addition to movable marker 340 high in reflectance also becomes higher. Since intensity of reflected light from static marker 330 remains low, a gap 362 may be produced between a distribution of luminance values of static marker 330 and a distribution of luminance values of housing 310. With this gap 362 serving as a kind of margin, accuracy in detection of a region corresponding to static marker 330 from the camera image can be enhanced.

Figure 13D:
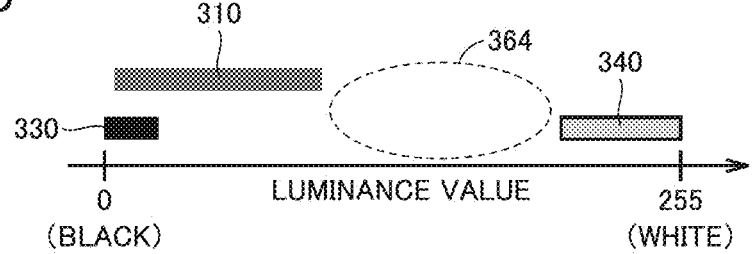

FIG. 13D shows a distribution of luminance values in a camera image obtained by shooting with intensity of IR rays emitted from light emitter 124 being set to relatively be low. Under such a shooting condition, intensity of reflected light from housing 310 in addition to static marker 330 low in reflectance is also lowered. Since intensity of reflected light from movable marker 340 remains high, a gap 364 may be produced between a distribution of luminance values of movable marker 340 and a distribution of luminance values of housing 310. With this gap 364 serving as a kind of margin, accuracy in detection of a region corresponding to movable marker 340 from the camera image can be enhanced.

As shown in FIGS. 13C and 13D, accuracy in detection of each marker can be enhanced by adjusting a shooting condition such as emission intensity of IR rays emitted from light emitter 124, a time period for exposure of camera 122, or a gain of camera 122 by making use of such a property that both of static marker 330 made of a "black" material and movable marker 340 made of a "white" material are less likely to be affected by change in intensity of emitted IR rays.

In the flowchart shown in FIG. 8, in detection of a pattern corresponding to static marker 330 (step S102), a shooting condition in which more reflected light is obtained also from a region relatively low in reflectance of a subject (increase in intensity of IR rays emitted from light emitter 124, extension of a time period for exposure of camera 122, and/or increase in gain of camera 122) is set. In detection of a pattern corresponding to movable marker 340 (step S110), a shooting condition in which reflected light from a region relatively high in reflectance of a subject is less (lowering in intensity of IR rays emitted from light emitter 124, decrease in time period for exposure of camera 122, and/or lowering in gain of camera 122) is set. Accuracy in detection of a marker can be enhanced by thus changing a shooting condition.

Since static marker 330, movable marker 340, and housing 310 should only be different from one another in reflectance in the present embodiment, a material and characteristics of each marker are not limited as described above so long as this condition is satisfied. For example, both of static marker 330 and movable marker 340 may be made of a reflective material. In this case, both markers or only one of them may be made of a retro-reflective material.

Alternatively, both markers may be made of a "black" material low in reflectance. In this case, reflectances different from each other can be set by making a degree of "black" differ.

Since static marker 330 and movable marker 340 are located in housing 310 in the embodiment described above, basically, a material for a portion where static marker 330 and movable marker 340 are located is often identical to a material for housing 310, however, limitation thereto is not intended. A member where static marker 330 and movable marker 340 are located or a material therefor may be a member or a material different from that for housing 310.

By appropriately setting a reflectance of static marker 330 and movable marker 340 as described above, possibility of erroneous detection of each marker can be lessened and an area of static marker region 410 and movable marker region 420 can substantially be increased.

(f3: Self-Luminous Marker)

A configuration example in which at least one marker is made of a reflective material in reception by camera 122 of reflected IR rays emitted from light emitter 124 is described above. Instead of such a kind of a passive device, a self-luminous device may be employed.

For example, a light emitting diode (LED) or an organic electro luminescence (EL) light emitting device may be adopted for at least one of static marker 330 and movable marker 340.

(f4: Material for Static Marker 330 and Movable Marker 340)

A reflectance of each marker in attachment 300 according to the present embodiment to IR rays emitted from light emitter 124 should appropriately be set. Since it is not necessary to strictly take into account a reflectance in a visible region, measures improving appearance may be applied.

A configuration example of a marker in attachment 300 according to the present embodiment will be described with reference to FIG. 14. A pattern of a marker may be prepared by using an ink containing a material (for example, carbon) which absorbs IR rays emitted from light emitter 124, and other regions may be colored with an ink of the same color which does not contain a material absorbing IR rays.

Since carbon absorbs IR rays, a black ink containing carbon is low in reflectance to IR rays. Then, a pattern of a marker of interest can be formed by using a black ink containing carbon and a black ink not containing carbon. Though such a marker can be recognized as a marker having any pattern in a camera image obtained by emitting IR rays, it looks like a uniform black band with naked eyes.

Figure 14:
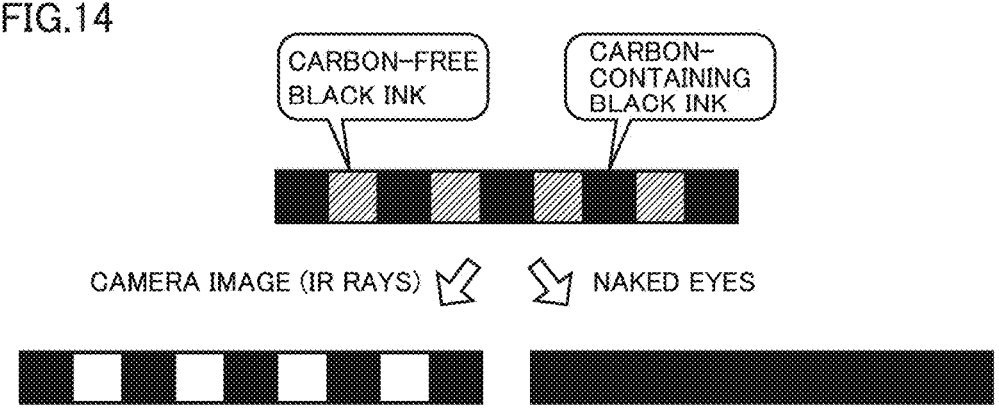
FIG. 14 shows an exemplary illustrative non-limiting drawing illustrating a configuration example of a marker in the attachment according to the present embodiment.

As shown in FIG. 14, by arranging a pattern composed of a material not absorbing IR rays (a carbon-free black ink) as being integrated with static marker 330 and/or movable marker 340 composed of a material absorbing IR rays (for example, a carbon-containing black ink), one cannot apparently recognize a function as the marker and hence a design is not compromised. Therefore, a user can be prevented from discovering a marker in attachment 300 and being disenchanted.

Since a marker should be prepared by mixing a carbon-containing black ink and a carbon-free black ink, a marker cannot be prepared with a general-purpose printer and a function to prevent counterfeit of attachment 300 can also be achieved.

In use for counterfeit prevention, it is not necessarily required to be associated with a marker as shown in FIG. 14. For example, counterfeit prevention can be achieved by arranging both of a pattern prepared with a carbon-containing black ink and an identical pattern prepared with a carbon-free black ink as being mixed.

A configuration example of a counterfeit-prevention-conscious marker in attachment 300 according to the present embodiment will be described with reference to FIG. 15. For example, a pattern functioning as static marker 330 or movable marker 340 is prepared with a carbon-containing black ink and a carbon-free black ink. In this case, though both of the patterns can be recognized as patterns with naked eyes, in a camera image obtained by emitting IR rays, only the pattern prepared with the carbon-containing black ink is recognized.

In general, in an application in which an operation by a user onto attachment 300 is detected, a position where a marker should be detected is predetermined, and one cannot know at which position a pattern prepared with a carbon-containing black ink should be located unless one knows information on this position in advance. Therefore, by additionally arranging a pattern prepared with a carbon-free black ink as a "dummy" pattern in attachment 300, counterfeit of attachment 300 by a third party can be prevented. The "dummy" pattern does not have to be identical to the pattern of static marker 330 or movable marker 340, and rather, an effect of counterfeit prevention can be enhanced by arranging a plurality of various patterns.

Thus, at least one of static marker 330 and movable marker 340 may be composed of a material absorbing IR rays (for example, a carbon-containing black ink), and one pattern or a plurality of patterns (dummy pattern(s)) composed of a material not absorbing infrared rays (for example, a carbon-free black ink) may be formed in a region other than the region where static marker 330 and movable marker 340 are located. In this case, one pattern or a plurality of patterns (dummy pattern(s)) composed of a material not absorbing infrared rays may be located between a plurality of static markers 330 or between a plurality of movable markers 340 as being integrated with the plurality of markers as shown in FIG. 15.

Figure 15:
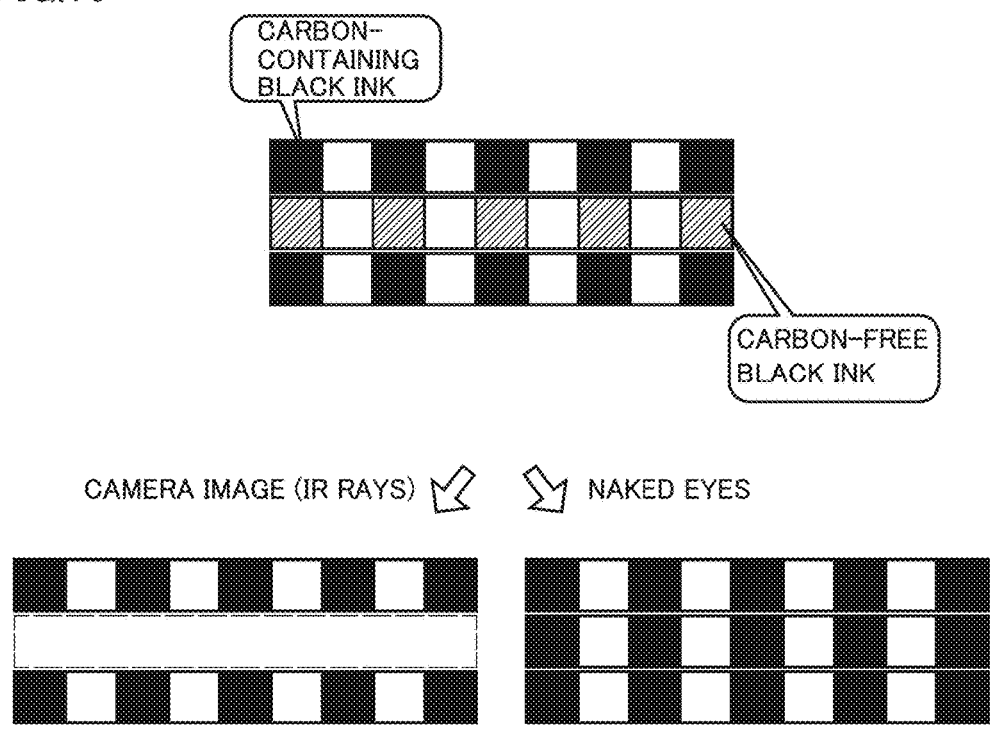
FIG. 15 shows an exemplary illustrative non-limiting drawing illustrating a configuration example of a counterfeit-prevention-conscious marker in the attachment according to the present embodiment.

As described above, by using a marker prepared with a material absorbing IR rays and a material not absorbing IR rays as shown in FIGS. 14 and 15, design quality can be enhanced and also an effect of counterfeit prevention can be exhibited.

<G. Use of NFC>

Though a configuration for obtaining individual information such as a type, a serial number, or an attribute of attachment 300 with the use of identification marker 332 included in static marker 330 is exemplified in the description above, such individual information of attachment 300 may be given by using an IC tag.

A configuration example of attachment 300 to which an IC tag 350 according to the present embodiment is attached will be described with reference to FIG. 16. IC tag 350 is located in association with a position of attachment of controller 100 (NFC reader-writer 134) in attachment 300. When controller 100 is supported by support portion 312, IC tag 350 is provided at a position corresponding to NFC reader-writer 134. Then, IC tag 350 establishes contactless communication with NFC reader-writer 134. IC tag 350 stores information specific to each attachment.

When controller 100 is attached to attachment 300, controller 100 can perform processing for reading data from IC tag 350 and specify whether or not attachment 300 is present and a type of attached attachment 300 based on a result of reading.

In this configuration, identification marker 332 included in static marker 330 (see FIGS. 10A and 10B) does not have to be provided. Furthermore, when movable marker region 420 in a camera image can be specified only based on a result of detection of movable marker 340, static marker 330 does not have to be provided at all.

Figure 16:
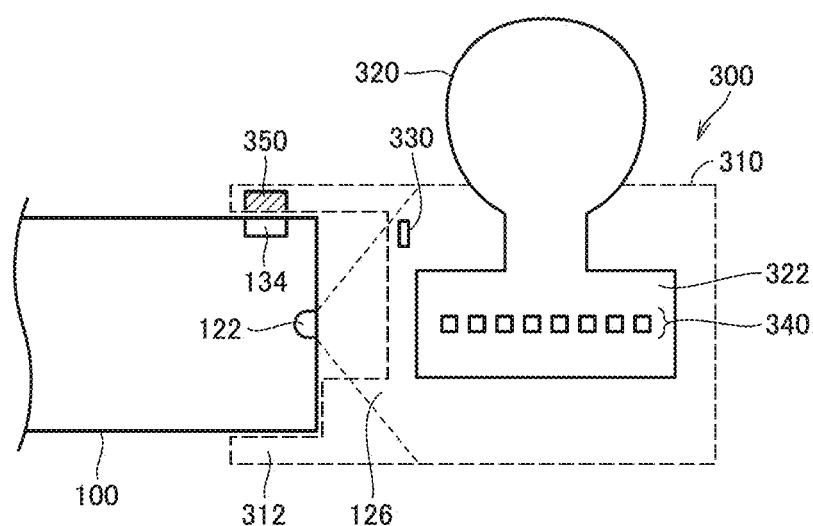
FIG. 16 shows an exemplary illustrative non-limiting drawing illustrating a configuration example of an attachment to which an IC tag is attached according to the present embodiment.

By using a marker and IC tag 350 as being combined as shown in FIG. 16, attachment of attachment 300 can more accurately be detected and a type or the like of attached attachment 300 can accurately be recognized. Since IC tag 350 can store data of any size, the number of types of identifiable attachments 300 can significantly be increased as compared with an example where a marker is used.

Since IC tag 350 can be prepared with relatively low cost and can contactlessly exchange information, it contributes to inexpensive provision of attachment 300.

When static marker 330 is not located, only movable marker region 420 should be set in a camera image and a position or the like of movable marker 340 should only be detected. Therefore, larger movable marker region 420 can be set and detection accuracy can be enhanced.

<H. Modification of Attachment>

A modification of attachment 300 will now be described.

Figure 17:
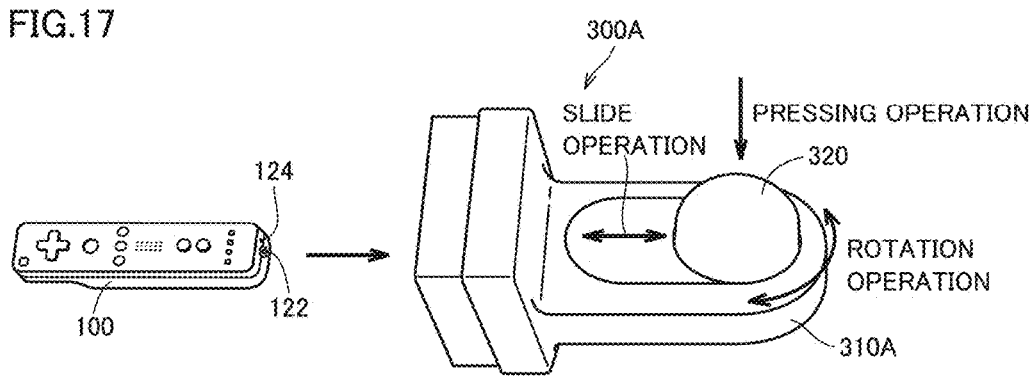
FIG. 17 shows an exemplary illustrative non-limiting drawing illustrating a configuration example of an attachment according to a modification of the present embodiment.

Referring to FIG. 17, an attachment 300A corresponds to a configuration obtained by adding a mechanism for performing a slide operation to attachment 300 shown in FIGS. 4A and 4B. More specifically, a part of operation portion 320 of attachment 300A is movably engaged with an opening in housing 310. A user can perform an operation to press operation portion 320 (a pressing operation), an operation to rotate operation portion 320 (a rotation operation), and an operation to slide operation portion 320 (a slide operation). Operation portion 320 of attachment 300 includes a button mechanism and a rotation mechanism. A configuration provided with only any one of the pressing operation and the rotation operation may be adopted. Attachment 300A includes a button mechanism, a rotation mechanism, and a slide mechanism. A configuration provided with only some of the pressing operation, the rotation operation, and the slide mechanism may be adopted.

Figure 18:
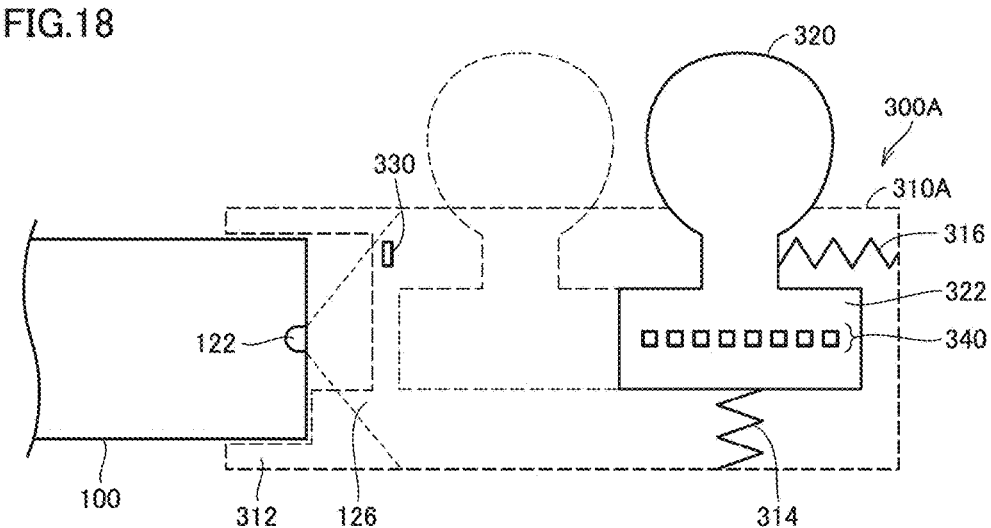
FIG. 18 shows an exemplary illustrative non-limiting drawing illustrating a method for detecting an operation by a user onto the attachment according to the modification of the present embodiment.

Referring to FIG. 18, a method similar to the method shown in FIGS. 5A and 5B is adopted also in detection of an operation by the user onto operation portion 320 of attachment 300A. In detecting a position of operation portion 320 involved with the slide operation, a size or the like of a pattern corresponding to movable marker 340 in a camera image can be made use of.

As shown in FIG. 18, biasing means such as a spring 316 for generating force against an operation to slide operation portion 320 by the user (a slide operation) is preferably employed. Attachment 300A shown in FIG. 18 includes a biasing mechanism which resists against a slide operation onto operation portion 320. By adopting such a biasing mechanism, such a motion that operation portion 320 is slid to a target position only while a user slides the operation portion and otherwise it remains at a basic position can be realized.

<I. Additional Aspects>

The present embodiment may include a technical concept as below.

[Item 1]

A game system including:
- a reader-writer which establishes contactless communication with a storage medium;
- an infrared camera which obtains an infrared image;
- a type determination module which determines a type of the storage medium based on information read by the reader-writer; and
- a game processing execution module which performs any game processing based on the type of the storage medium determined by the type determination module and the infrared image obtained by the infrared camera.

[Item 2]

The game processing execution module may perform different game processing depending on the type of the storage medium based on the infrared image.

[Item 3]

An attachment configured to be attached to a game controller incorporating a reader-writer, the attachment including:
- a housing;
- a support portion which supports the game controller; and
- an IC tag which is provided at a position corresponding to the reader-writer and establishes contactless communication with the reader-writer while the support portion supports the game controller.

[Item 4]

An attachment configured to be attached to a game controller incorporating a camera and a reader-writer, the attachment including:
- a housing;
- an operation portion in the housing;
- a support portion which supports the game controller such that a direction of shooting of the camera is oriented to the inside of the housing; and
- an IC tag which is provided at a position corresponding to the reader-writer and establishes contactless communication with the reader-writer while the support portion supports the game controller,
- the operation portion including a movable member at a position in the housing, a position of the movable member being variable in accordance with an operation onto the operation portion.

<J. Advantages>

According to the present embodiment, an attachment which can implement various game operations by being used together with a game controller or the like while it maintains a simplified configuration and a game system including the attachment can be realized.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An attachment configured to be attached to a game controller with a camera, the attachment comprising:
a housing having a support portion which supports the game controller; and
an operation portion in the housing, wherein
the support portion is configured to support the game controller such that a direction of shooting of the camera is oriented to inside of the housing and support the game controller such that a field of view of shooting with the camera includes a first region including a first indication in the housing as a subject and a second region including a second indication in the housing as a subject,
the first indication is located such that a position of the first indication is maintained regardless of an operation onto the operation portion, and
the second indication is located such that a position of the second indication is variable in accordance with an operation onto the operation portion.

2. The attachment according to claim 1, wherein
at least one of the first indication and the second indication is made of a reflective material.

3. The attachment according to claim 1, wherein
the first indication contains information for detecting presence of the attachment.

4. The attachment according to claim 1, wherein
the first indication contains information for specifying a type of the attachment.

5. The attachment according to claim 1, wherein
the first indication contains information indicating a reference position for detecting variation in position by the operation onto the operation portion.

6. The attachment according to claim 1, wherein
the first indication is located on an outer peripheral side in the field of view of shooting with the camera, and
the second indication is located on an inner side relative to the first indication in the field of view of shooting with the camera.

7. The attachment according to claim 1, wherein
the operation portion comprises a button mechanism.

8. The attachment according to claim 1, wherein
the operation portion comprises a rotation mechanism.

9. The attachment according to claim 1, wherein
the operation portion comprises a slide mechanism.

10. The attachment according to claim 1, wherein
the operation portion comprises a biasing mechanism which resists against the operation onto the operation portion.

11. The attachment according to claim 1, wherein
the camera includes an infrared camera.

12. The attachment according to claim 11, wherein
at least one of the first indication and the second indication is made of a material which absorbs infrared rays, and a pattern made of a material which does not absorb infrared rays is further formed in a region other than a region where the first indication and the second indication are located.

13. The attachment according to claim 12, wherein
the pattern made of the material which does not absorb the infrared rays is located as being integrated with at least one of the first indication and the second indication.

14. The attachment according to claim 13, wherein
the pattern made of the material which does not absorb the infrared rays is located between a plurality of the first indications or between a plurality of the second indications, as being integrated with the plurality of the indications.

15. The attachment according to claim 1, wherein
the game controller further comprises a light source for emitting light to the subject, and
the first indication has a lower reflectance to light from the light source than the second indication.

16. The attachment according to claim 1, wherein
the camera has a light source for emitting light to the subject, and
an inner surface of the housing has an intermediate reflectance to light from the light source between a reflectance of the first indication to light from the light source and a reflectance of the second indication to light from the light source.

17. The attachment according to claim 1, wherein
the first indication and the second indication are located so as to be different in depth position in the direction of shooting with the camera.

18. A game system comprising:
a game controller with a camera;
an attachment configured to be attached to the game controller; and
a main body which processes operation data obtained by the game controller, wherein
the attachment comprises
    a housing having a support portion which supports the game controller, and
    an operation portion in the housing,
the support portion is configured to support the game controller such that a direction of shooting of the camera is oriented to inside of the housing and support the game controller such that a field of view of shooting with the camera includes a first region including a first indication in the housing as a subject and a second region including a second indication in the housing as a subject,
the first indication is located such that a position of the first indication is maintained regardless of an operation onto the operation portion,
the second indication is located such that a position of the second indication is variable in accordance with an operation onto the operation portion,
the game controller is configured to transmit image data obtained by shooting with the camera to the main body, and
the main body is configured to perform first processing based on an image of a portion corresponding to the first region included in the image data and perform second processing based on an image of a portion corresponding to the second region included in the image data and a result of the first processing.

19. The game system according to claim 18, wherein
the game controller is further configured to extract a part of an entire image shot by the camera and generate the image data.

20. The game system according to claim 18, wherein
the main body is configured to generate region specifying information which specifies the second region as the first processing and transmit the region specifying information to the game controller,
the game controller is configured to generate the image data corresponding to the second region based on the region specifying information and transmit the image data to the main body, and
the main body is configured to perform the second processing based on the image data corresponding to the second region.

21. The game system according to claim 18, wherein
the main body is further configured to extract a partial image necessary for the first processing and the second processing from the image data received from the game controller.

* * * * *